US 6,704,773 B1

United States Patent
Cohn et al.

(10) Patent No.: US 6,704,773 B1
(45) Date of Patent: *Mar. 9, 2004

(54) DISTRIBUTING DATA OVER A COMMUNICATIONS NETWORK FOR DISPLAY

(75) Inventors: Alan Cohn, New York, NY (US); Timo Bruck, Mountain View, CA (US); Stephen G. Perlman, Mountain View, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/007,988

(22) Filed: Nov. 13, 2001

Related U.S. Application Data

(63) Continuation of application No. 09/149,407, filed on Sep. 8, 1998, now Pat. No. 6,317,780, which is a continuation-in-part of application No. 09/107,651, filed on Jun. 30, 1998, now Pat. No. 6,237,039.

(51) Int. Cl.[7] .............................................. G06F 15/16
(52) U.S. Cl. ....................................................... 709/217
(58) Field of Search ............................... 709/217–219, 709/224–225, 227, 232, 245; 725/10, 35, 36, 41, 42; 370/327, 368

(56) References Cited

U.S. PATENT DOCUMENTS

| 5,305,195 A | 4/1994 | Murphy ........................ 364/401 |
| 5,572,643 A | 11/1996 | Judson ......................... 395/793 |
| 5,659,367 A | 8/1997 | Yuen ........................... 348/465 |
| 5,675,510 A | 10/1997 | Coffey et al. ................. 709/224 |
| 5,737,619 A | 4/1998 | Judston ........................ 395/761 |
| 5,796,424 A | 8/1998 | Ely et al. ...................... 348/15 |
| 5,796,952 A | 8/1998 | Davis et al. ............ 395/200.54 |
| 5,818,439 A | 10/1998 | Nagasaka et al. ............ 345/327 |
| 5,828,837 A | 10/1998 | Eikeland ................ 395/200.32 |
| 5,848,396 A | 12/1998 | Gerace ........................... 705/10 |
| 5,884,028 A | 3/1999 | Kindell et al. ............... 709/234 |
| 5,898,833 A | 4/1999 | Kidder ................... 395/200.64 |

(List continued on next page.)

FOREIGN PATENT DOCUMENTS

| EP | 0 749 081 | 12/1996 | ..................... 60/17 |
| WO | WO 93/19427 | 9/1993 | ..................... 21/15 |
| WO | WO 96/30864 | 10/1996 | |

OTHER PUBLICATIONS

FGDC, "Details of instructions for preparing a Data description using the NOAA FGDC Meta data standard template", Jun. 8, 1994, U.S. Geological Survey National Center, 2 pages.

Berners et al., "Universal Resource Identifiers in WWW" (RFC 1630), 6/94, W3.org, 25 pgs.

Jupiter, "Content's Manifest Destiny," Dec. 1997, pp. 2.

Microsoft unveils advertising, "Electronic Market Place Report," Aug. 1995, v9, n15, p. 1.

Taylor, Cathy "Going Beyond the Banner," Jul. 1996, pp. 36–41.

(List continued on next page.)

*Primary Examiner*—Bunjob Jaroenchonwanit
(74) *Attorney, Agent, or Firm*—Workman Nydegger

(57) ABSTRACT

A system and method for distributing and presenting data such as advertisements from a host server to a browsing device through a communications network. The method involves preloading data from the host server to the browsing device though the communications network, storing the data in the browsing device, detecting a second period of idle time in browsing device operation, and presenting the data through the browsing device upon detection of the second period of idle time.

41 Claims, 7 Drawing Sheets

U.S. PATENT DOCUMENTS

| | | |
|---|---|---|
| 5,905,492 A | 5/1999 | Straub et al. ............... 345/333 |
| 5,913,040 A | 6/1999 | Rakavy et al. ......... 395/200.62 |
| 5,929,850 A | 7/1999 | Broadwin et al. .......... 345/327 |
| 5,933,811 A | 8/1999 | Angles et al. ................ 705/14 |
| 5,937,037 A | 8/1999 | Kamel et al. ............ 379/88.19 |
| 5,948,061 A | 9/1999 | Merriman et al. .......... 709/219 |
| 5,960,429 A | 9/1999 | Peercy et al. .................. 707/5 |
| 5,974,398 A | 10/1999 | Hanson et al. ................ 705/14 |
| 5,978,381 A | 11/1999 | Perlman et al. ............. 370/432 |
| 5,991,735 A | 11/1999 | Gerace ........................ 705/10 |
| 6,009,410 A | 12/1999 | LeMole et al. ............... 705/14 |
| 6,009,452 A | 12/1999 | Horvitz ...................... 709/102 |
| 6,018,619 A | 1/2000 | Allard et al. .......... 385/200.54 |
| 6,028,600 A | 2/2000 | Rosin et al. ................ 345/327 |
| 6,034,652 A | 3/2000 | Freiberger et al. ............. 345/2 |
| 6,047,327 A | 4/2000 | Tso et al. ................... 709/232 |
| 6,049,831 A | 4/2000 | Gardell et al. ............. 709/236 |
| 6,061,738 A | 5/2000 | Osaka et al. ................ 709/245 |
| 6,073,167 A | 6/2000 | Poulton et al. ............. 709/206 |
| 6,076,093 A | 6/2000 | Pickering ................ 707/104.1 |
| 6,081,629 A | 6/2000 | Browning ................... 382/313 |
| 6,098,069 A | 8/2000 | Yamaguchi ................ 707/102 |
| 6,101,549 A | 8/2000 | Baugher et al. ............ 709/238 |
| 6,119,098 A | 9/2000 | Guyot et al. .................. 705/14 |
| 6,133,912 A | 10/2000 | Montero ..................... 345/716 |
| 6,134,584 A | 10/2000 | Chang et al. ............... 709/219 |
| 6,144,944 A | 11/2000 | Kurtzman, II et al. ........ 705/14 |
| 6,144,973 A | 11/2000 | Fujii et al. ................ 707/501.1 |
| 6,154,771 A | 11/2000 | Rangan et al. .............. 709/217 |
| 6,167,453 A | 12/2000 | Becker et al. .............. 709/245 |
| 6,173,316 B1 | 1/2001 | De Boor et al. ............ 709/218 |
| 6,175,862 B1 | 1/2001 | Chen et al. .................. 709/218 |
| 6,184,878 B1 | 2/2001 | Alonso et al. .............. 345/327 |
| 6,185,586 B1 | 2/2001 | Judson ....................... 707/513 |
| 6,219,042 B1 | 4/2001 | Anderson et al. ........... 345/716 |
| 6,230,324 B1 | 5/2001 | Tomita et al. ................. 725/51 |
| 6,237,039 B1 * | 5/2001 | Perlman ..................... 709/237 |
| 6,240,456 B1 | 5/2001 | Teng et al. ................. 709/230 |
| 6,260,066 B1 | 7/2001 | Bittinger et al. ............ 709/224 |
| 6,308,202 B1 * | 10/2001 | Cohn et al. ................... 705/27 |
| 6,308,221 B1 * | 10/2001 | Perlman et al. ............. 709/241 |
| 6,317,780 B1 * | 11/2001 | Cohn et al. ................. 709/217 |
| 2001/0001160 A1 | 5/2001 | Shoff et al. ................... 725/51 |

OTHER PUBLICATIONS

"Monitoring Corporate Info. with First Floor Products," First Floor Inc. 1996.

Fortanet et al., "Netvertising: Content–Based Subgeneric Variations in a Digital Genre," IEEE, 1998, pp. 10.

Monticino, "Web–analysis: Stripping away the hype," Dec. 1998, v31, n12, pp. 3.

Mcarthur, "World Wide Web & HTML," Dr. Dobbs' Journal, Dec. 1994.

* cited by examiner

DISTRIBUTING DATA OVER A COMMUNICATIONS NETWORK FOR DISPLAY

RELATED APPLICATIONS

This application is a continuation of U.S. patent application Ser. No. 09/149,407, now U.S. Pat. No. 6,317,780 entitled "SYSTEM AND METHOD FOR DISTRIBUTING DATA OVER A COMMUNICATIONS NETWORK", filed Sep. 8, 1998, which is a continuation in part of Ser. No. 09/107,651 filed on Jun. 30, 1998, now U.S. Pat. No. 6,237,039 which is incorporated herein by reference.

BACKGROUND OF THE INVENTION

1. The Field of the Invention

The present invention relates generally to distributing data to users of a communications network, and more particularly, to distributing data from a host server to a browsing device via a communications network such as the Internet.

2. Background and Related Art

In modern society, communications networks such as the Internet enable vast numbers of persons to communicate a virtually limitless variety of information across great distances. The development of the World Wide Web has enabled persons with relatively little technical training to find and display information in a multimedia format using a browsing device, such as a personal computer or television set-top box (STB), running a browser program, such as MICROSOFT® Internet Explorer or Netscape Navigator. As a result, the number of sites and the number of users on the Internet have concomitantly experienced meteoric growth.

For aid in accessing the Internet, many users subscribe to Internet access services, such as the WEBTV® Internet access network. (WEBTV is a registered trademark of WebTV Networks, Inc. of Mountain View, Calif.) The WEBTV Internet access network includes a large number of browsing devices, referred to as client terminals, and at least one host server. The client terminals are connected to the Internet via conventional modem pools, either by Integrated Services Digital Network (ISDN) connection, a telephone line, or another data link, and can directly access web pages established by Internet publishers. The host server communicates with the client terminals to provide a convenient standardized interface for accessing the Internet. The host server also offers supplemental services, such as email, news reports, television program guides, and enhanced access to certain web pages for subscribers of the service.

As the audience of users of these Internet access services has grown, so too has the potential of such services to deliver advertising content through the Internet. Unfortunately, while a healthy variety of advertising methods exists for publishers of Internet sites, vendors of Internet access services face a lack of methods by which they may effectively deliver advertising content to their subscribers.

The publisher of an Internet site is able to advertise by several presently known methods. For example, a publisher may include advertisements m graphical banners or audio jingles on an Internet site. A publisher also may include a text or graphical link to another web page containing information about an advertiser or advertised product. It is also known to embed hidden advertisement links within a standard hypertext link to a destination Internet site. When a user selects the link, intending to go to the destination page, the user also unwittingly triggers the embedded link, and is briefly shown an advertisement before the browsing device continues to download the destination page. This type of interstitial advertising requires the user to wait while the browsing device downloads and displays the advertisement. Interstitial advertising methods are also known in which advertising information embedded in a web page or in the home page of the browser, or cached in the client browsing device itself is presented in response to selection of a hypertext link on a web page (see Judson, U.S. Pat. No. 5,572,643, the disclosure of which is herein incorporated by reference). These advertising methods also delay the user during download of the advertising information.

Publishers of Internet sites typically advertise using "pull technology". Pull technology is so-named because a user must request information, or pull it, from a server before the information will be sent to the user's browsing device. For each of the above-mentioned forms of advertising, the user must direct the browsing device to download the information.

Despite the availability of advertising methods for publishers, Internet access services face several problems when advertising. First, pull technology is not an effective means of distributing advertising for Internet access services. Often an Internet access service merely offers the user a dial-up connection to the Internet. In such a case, the Internet access service is largely invisible to the user. The user typically uses a modem to dial a phone number and establishes a connection to the Internet, and uses an off-the-shelf browser program to access web pages through the Internet. Pull technology cannot be used to distribute advertising to a user of such an Internet access service because the user is not accessing any web pages published by the Internet access service.

Other Internet access services, such as the WEBTV Internet access network, offer Internet access via a proprietary interface allowing access to subscriber services, such as a web directory and search engine, as well as to the Internet. Pull technology may be used to advertise directly to users of such an Internet access service, but only when the users are accessing the web pages published by the Internet access service. When users simply use the Internet access service to view external web pages on the Internet, not published by the Internet access provider, pull technology is ineffective to distribute advertising.

When a user's browsing device is pointed elsewhere, Internet access services must resort to "push technology" for advertising. According to push technology, a server pushes information to a browsing device without request from the user, or based on a predetermined request from the user. Current push technology causes the user two types of delay. First, the user experiences delay as the browsing device takes time to download the pushed information. Second, the user is delayed when interrupted by an unrequested display of pushed information. Such delay may be annoying to the user, and may decrease the effectiveness of the advertising due to the intrusive nature of the advertisement.

Current browsing devices also cause the user delay. Users typically experience delay during start-up and shutdown of the device. In addition, a browsing device may appear to stall while performing internal operations, such as erasing cached files. Finally, the browsing device may experience delay when connecting to external devices and remote computers via a communications network. These inherent delays in using the browsing device further aggravate the user and decrease the enjoyability of using a browsing device to navigate a communications network.

It would be desirable to provide a method for distributing data wherein data is downloaded from a host server across a communications network and displayed by a browsing device without causing delay to the user of the browsing device. It would also be desirable to utilize inherent delays in browsing device operation, such as wasted start-up time and downloading time between web pages, to display advertising.

BRIEF SUMMARY OF THE INVENTION

A method and system are provided for delivering data from a host server to a browsing device through a communications network. The method typically includes detecting a first period of idle time of the browsing device, preloading data from the host server to the browsing device upon detecting the first period of idle time, and storing the data in the browsing device. The first period of idle time may be a period of temporary inactivity of the browsing device, such as a period of graphical user interface inactivity or a period of network communications inactivity. The method also typically includes detecting a second period of idle time of the browsing device and presenting the data through the browsing device upon detecting the second period of idle time. The second period of idle time may be a download waiting period during which the browsing device has attempted to begin, but has not completed, downloading information from a remote server. Alternatively, the second period of idle time may be a connect waiting period, during which the browsing device attempts to connect to a remote server. The method also may interrupt preloading or presenting the data upon detection of a determined browsing device event, such as initiation of other network communications by the browsing device, or completion of downloading information from a remote server.

The system typically includes a host server connected to a browsing device through a communications network. The browsing device and the host server are collectively configured to establish a connection and preload data from the host server to the browsing device upon detection of a first period of idle time in browsing device operation. The first period of idle time may be a period of temporary inactivity of the browsing device, such as a period of graphical user interface inactivity or a period of network communications inactivity. Typically, the browsing device is configured to present the data upon detection of a second period of idle time in browsing device operation, such as a connect waiting period or a download waiting period which may occur while downloading information from a remote server. The browsing device is also typically configured to cease presentation of the data upon detection of a determined browsing device event, such as completion of a downloading operation, a user interaction with the graphical user interface, or initiation of other network communications by the browsing device.

DETAILED DESCRIPTION OF THE PREFERRED EMBODIMENTS

FIGS. 1–7 and the following discussion are intended to provide a brief, general description of a suitable networked computing environment in which the invention may be implemented. Those skilled in the art will appreciate that the invention may be practiced with other networked computer devices, including hand-held devices, multiprocessor systems, minicomputers, mainframe computers, and the like. The invention may also be practiced in distributed computing environments where tasks are performed by remote processing devices that are linked through a communications network.

Figure 1:
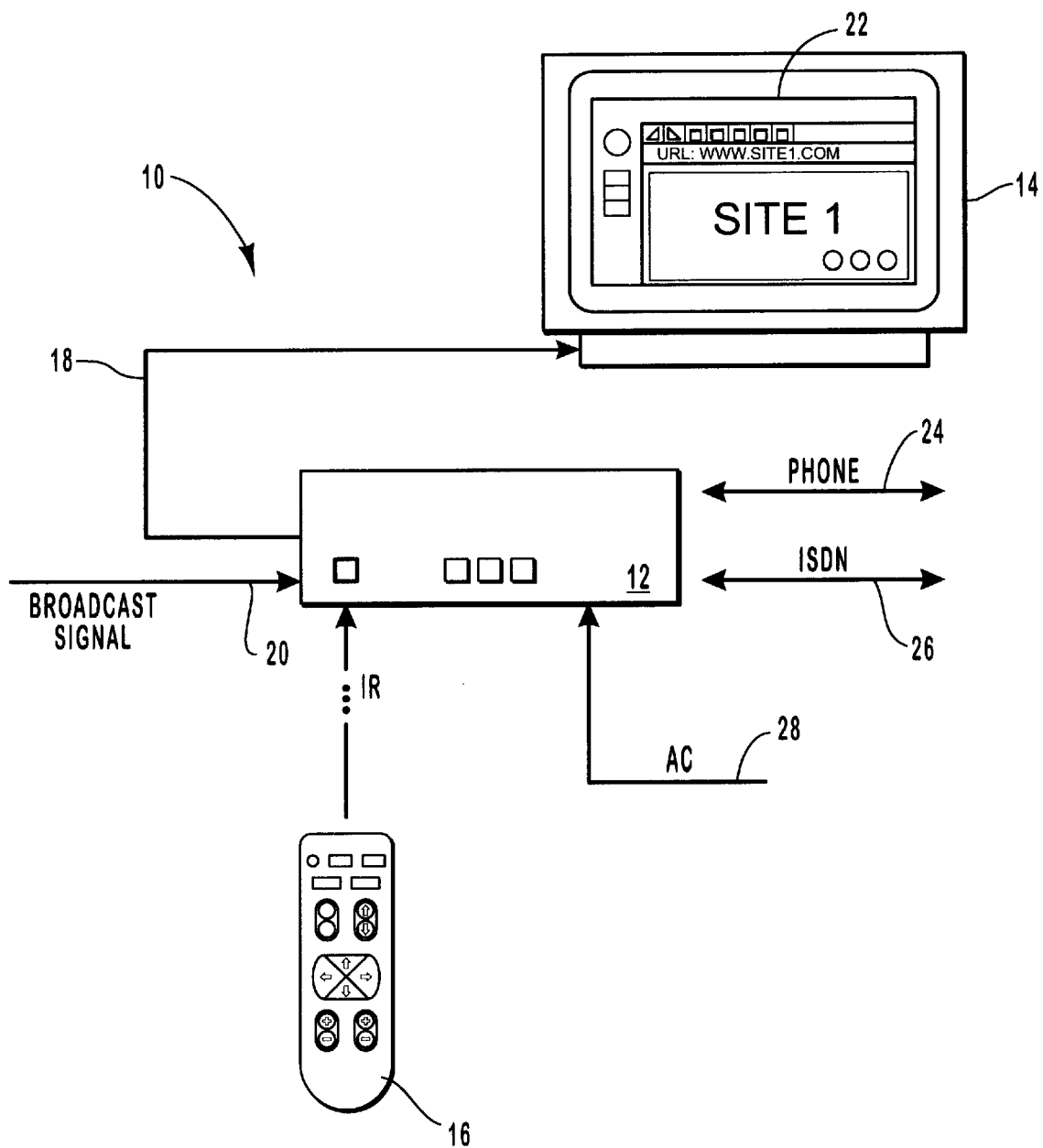
FIG. 1 is a somewhat schematic view of a browsing device in the form of a set-top box connfigured for use in accordance with the present invention.

FIG. 1 depicts a browsing device 10 in the form of a WEBTV client terminal. As indicated, the client terminal includes an electronics unit 12, an ordinary television 14, and a remote control 16. Electronics unit 12 typically is referred to as a set-top box (STB), because of its usual placement on top of television 14. Set-top box 12, however, may be built into television 14, forming an integral unit. The client terminal uses television 14 as a display device for displaying both video data and a graphical user interface, and as a loudspeaker device for emitting audio data. The set-top box is coupled to the television by a communications link 18. The link is an RF (radio frequency), S-video, composite video, or other equivalent form of communications link.

The set-top box includes hardware and/or software for receiving and decoding a broadcast video signal 20, such as an NTSC, PAL, SECAM or other TV system video signal, and providing video data to the television via link 20. Set-top box 12 also includes a browser program, which may be implemented in hardware and/or software, to cause a graphical user interface 22 to be displayed on television 14. The browser program enables a user to access various WEBTV network services, browse the World Wide Web, send email, or otherwise access the Internet Client terminal 10 may include both a standard modem and an ISDN modem, such that the communication link between set-top box 12 and the Internet can be either a telephone (POTS) connection 24 or an ISDN connection 26. The set-top box receives power through a power line 28.

Remote control 16 is operated by the user to control television viewing, and to control the client terminal while browsing the World Wide Web, sending email, or performing other Internet-related functions. The set-top box receives commands from remote control 16 via an infrared (IR) communication link. Alternately, the link between the remote control and the set-top box may be an RF communication link or any equivalent communication link (e.g., wires, etc.).

Figure 2:
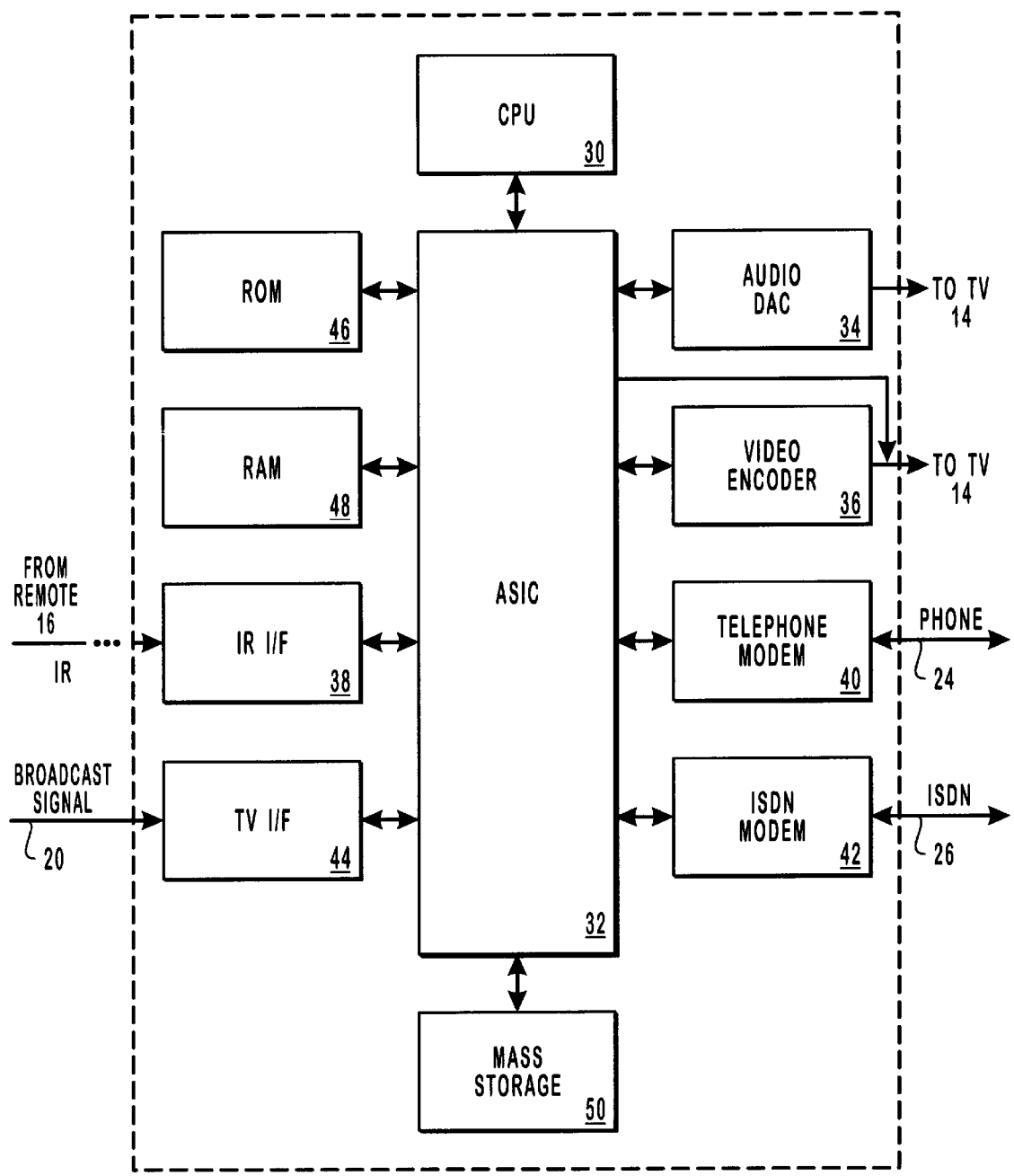
FIG. 2 is a schematic view illustrating the architecture of the browsing device of FIG. 1.

FIG. 2 is a block diagram illustrating internal features of set-top box 12. In this illustration, operation of the client terminal is controlled by a processing unit, such as central processing unit (CPU) 30, which is coupled to an Application-Specific Integrated Circuit (ASIC) 32. The CPU executes software designed to implement various features of the present invention. ASIC 32 contains circuitry which may be used to implement these features. ASIC 32 is coupled to an audio digital-to-analog converter (DAC) 34 which provides audio output to television 14. In addition, ASIC 32 is coupled to a video encoder 36 which provides video output to television 14. An IR interface 38 detects IR signals transmitted by remote control 16 and, in response, provides corresponding electrical signals to ASIC 32. A standard telephone modem 40 and an ISDN modem 42 are coupled to ASIC 32 to provide for connection(s) to the Internet. Those skilled in the art will appreciate that the set-top box also may include a cable television or radio frequency modem (not shown).

A TV interface 44 is coupled to ASIC 32 to receive broadcast video signals, such as an NTSC video signal, and to provide corresponding electrical signals to ASIC 32. This allows video data carried in broadcast video signal 20 to be presented to the viewer on television 14. More specifically, TV interface 44 is configured to digitize the incoming video signal, which is stored in RAM 48, 50 that ASIC 32 and CPU 30 can process the video signal before displaying it on the television. This configuration enables the set-top box to generate shared screen viewing where the video signal only occupies a portion of the screen. The remaining screen area then can be used to display various user interface controls or data, such as video programming information.

Also coupled to ASIC 32 is memory, including random access memory (RAM) 48 and read-only memory (ROM) 46, which provides for storage of program code for implementing application software to be executed by the set-top box. Note that ROM 46 may be a programmable ROM (PROM), or any form of erasable PROM (EPROM), or flash memory. A mass storage device 50 optionally may be provided and coupled to ASIC 42. The mass storage device may be used to input software or data to the client terminal or to store downloaded software or data. Mass storage device 50 can be any suitable device for storing machine-executable instructions, such as a magnetic drive, optical drive, and the like.

Figure 3:
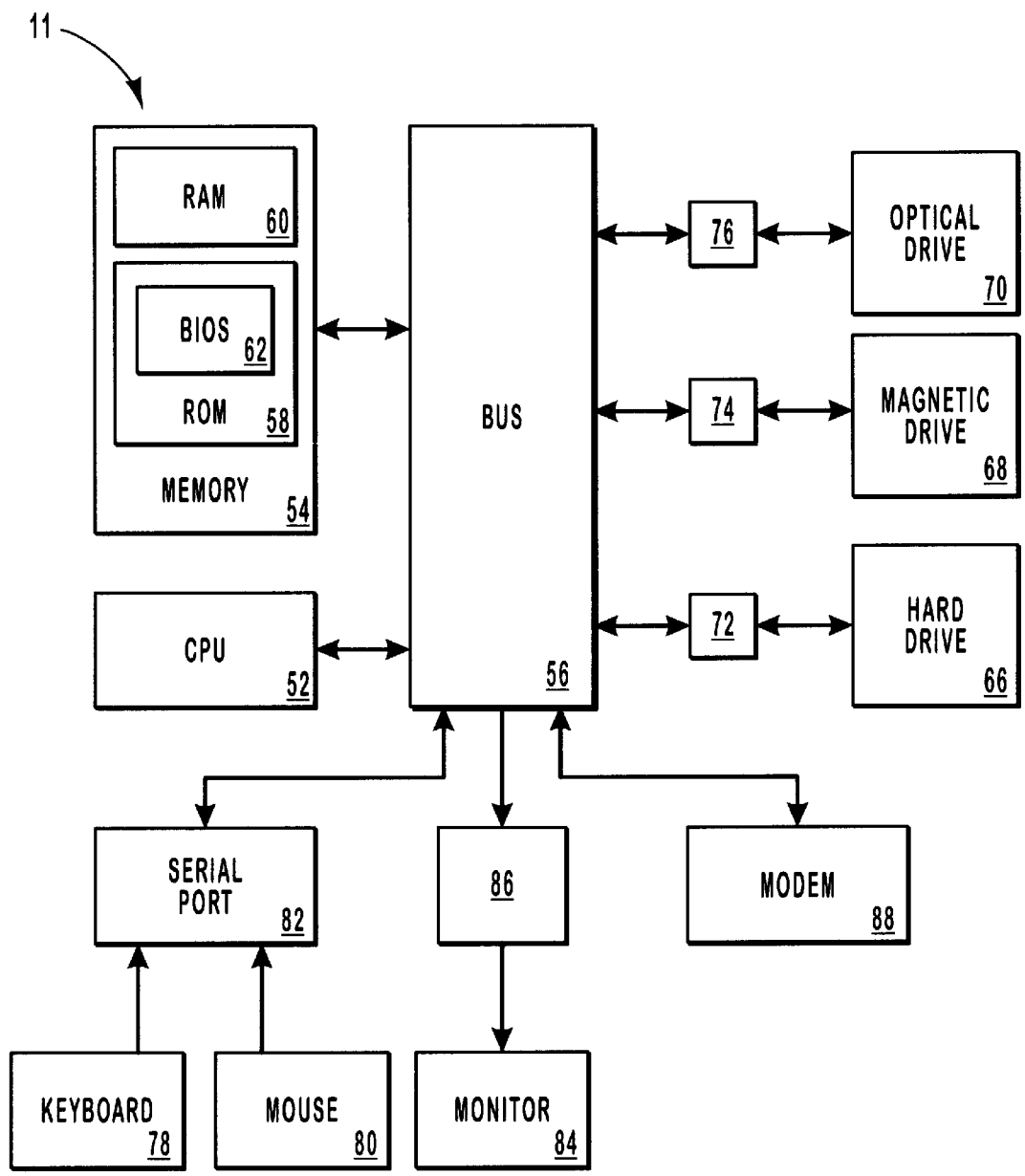
FIG. 3 is a schematic view of a browsing device in the form of a personal computer configured for use as part of the present invention.

FIG. 3 depicts an alternate browsing device in the form of a conventional personal computer 11, including a central processing unit (CPU) 52, a memory 54, and a bus 56 that couples various components (including the memory) to the CPU. The bus 56 may be any of several types of bus structures, including a memory bus or memory controller, a peripheral bus, or a local bus using any of a variety of bus architectures. The memory includes read only memory (ROM) 58 and random access memory (RAM) 60. A basic input/output system 62 (BIOS), containing basic routines which help to transfer information between elements within the personal computer (such as during start-up), is stored in ROM 58.

The personal computer further includes a hard disk drive 66 for reading from and writing to a hard disk, a magnetic disk drive 68 for reading from or writing to a removable magnetic disk, and an optical disk drive 70 for reading from or writing to a removable optical disk such as a CD ROM or other optical media. Hard disk drive 66, magnetic disk drive 68, and optical disk drive 70 are connected to bus 56 by a hard disk drive interface 72, a magnetic disk drive interface 74, and an optical drive interface 76, respectively. The drives and their associated computer-readable media provide non-volatile storage of computer-readable instructions, data structures, program modules and other data for the personal computer.

Although the exemplary environment shown in FIG. 3 employs a hard disk, a removable magnetic disk, and a removable optical disk, it should be appreciated by those skilled in the art that other types of computer readable media which can store data which is accessible by a computer (e.g. magnetic cassettes, flash memory cards, digital video disks, Bernoulli cartridges, random access memories (RAMs), read only memories (ROMs), etc.) also may be used.

A number of program modules may be stored on the hard disk, magnetic disk, optical disk, ROM 58, or RAM 60, including an operating system, one or more application programs, other program modules, and program data. A user may enter commands and information into the personal computer 11 through input devices such as a keyboard 78 and/or a pointing device (mouse) 80. Other input devices (not shown) may include a microphone, joystick, game pad, satellite dish, scanner, or the like. These and other input devices often are connected to the processing unit 52 through a serial port interface 82 which is coupled to the bus. However, the input devices may be connected by other interfaces, such as a parallel port, game port or a universal serial bus (USB).

A monitor 84 or other type of display device is also connected to the bus 56 via an interface, such as a video adapter 86. In addition to the monitor, personal computers typically include other peripheral output devices (not shown) such as speakers and printers. Finally, personal computer 11 includes a browser program, which may be implemented in hardware and/or software, to cause a graphical user interface to be displayed on monitor 84. The user employs the graphical user interface to browse the World Wide Web, send email, and otherwise access the Internet. The personal computer also typically includes a modem 88, such as an ISDN modem or telephone line modem, connected to the serial bus for communication with remote computers through a communications network.

Figure 4:
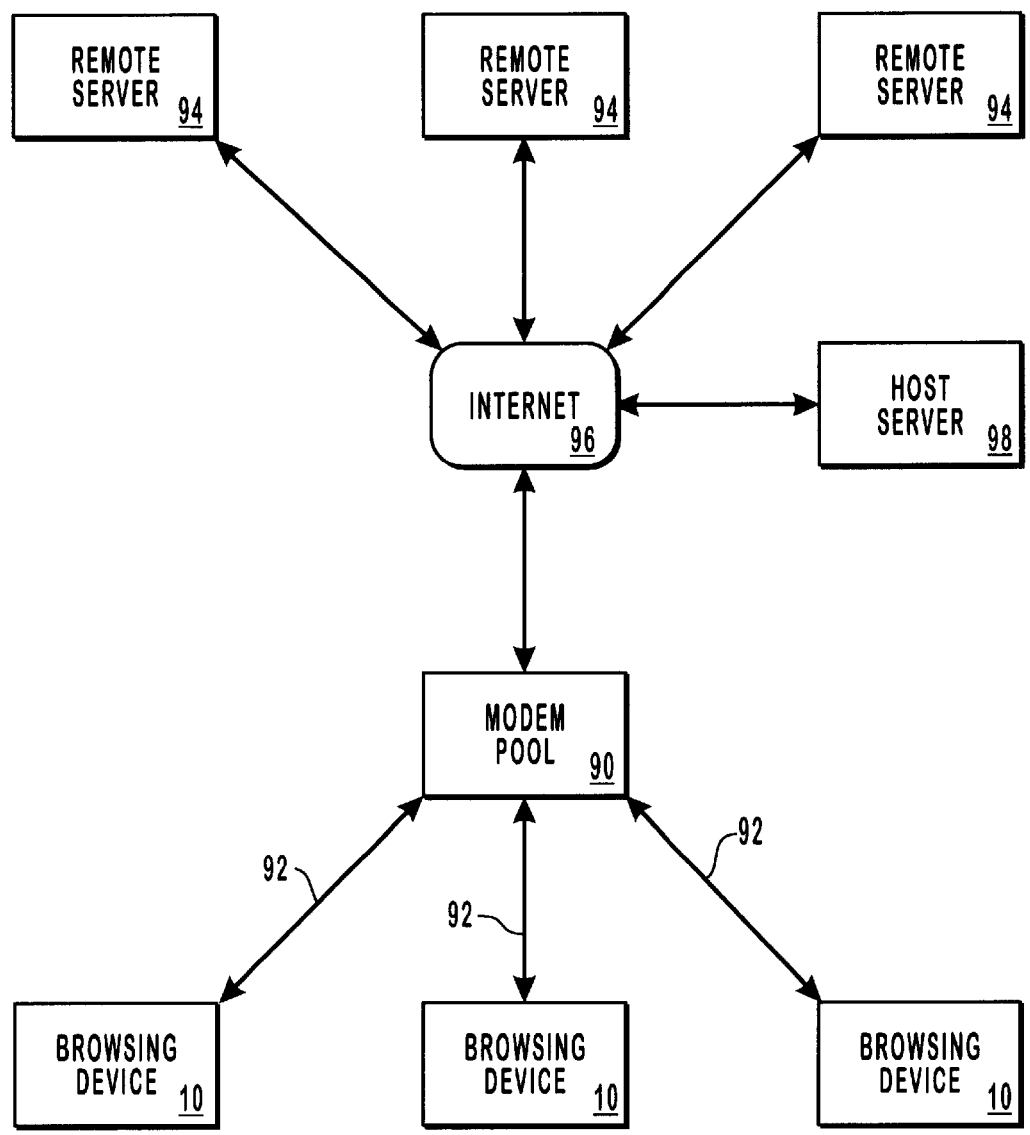
FIG. 4 is a schematic view of the structure of a communications network for use by browsing devices as shown in FIGS. 1 and 3.

FIG. 4 illustrates a basic configuration of a networked computing environment in which a browsing device, such as a client terminal or personal computer, typically operates. A number of browsing devices 10 are coupled to a modem pool 90 via bi-directional data connections 92, which may be a telephone connection, ISDN connection, or any other similar type of connection, such as cable and satellite forward channels. Modem pool 90 typically is coupled through a router, such as that conventionally known in the art, to a number of remote servers 94 via a conventional communications network 96, such as the Internet. The communications network also includes a host server 98, which specifically supports and communicates with browsing devices 10. The browsing devices each have a connection to host server 98 through modem pool 90 and the Internet. Note that modem pool 90 is a conventional modem pool, such as is found today throughout the world providing access to the Internet and private networks.

The present invention preferably is implemented on a communications network navigable by hypertext links, such as the World Wide Web. The World Wide Web encompasses a vast collection of web pages residing as data files on remote servers connected to the Internet. Each web page is downloadable and viewable by a browsing device, and often contains hypertext links, which, if selected, cause the browsing device to point to, or download and display, a new web page.

Within the World Wide Web, a collection of related web pages forms a web site. Individuals or organizations that provide content to the World Wide Web are known as publishers. A single publisher on the Internet may establish a single page, an entire web site, or multiple web sites. Web pages are stored as data files on remote servers, and transmitted to browsing devices upon request from each browsing device. Each remote server has a unique domain name or Internet protocol (IP) address which marks its location on the Internet. Each data file which contains web page data has a unique file path to indicate its location within the remote server.

To download and present data from a remote server over the communications network, browsing device 10 contacts a remote server 94 through communications network 96 using a network address such as a universal resource locator (URL). The URL, it will be appreciated, contains the protocol by which the data is to be transferred, as well as the domain name or IP address at which the remote server is located, and the file path of the specific file to be transferred. The remote server then transmits the requested data to the browser program, which in turn displays the data according to predefined conventions.

Data files containing web pages typically are transmitted using the HyperText Transfer Protocol (HTTP), and encoded using the HyperText Markup Language (HTML). The HTML language provides a standard for interpretation of text data, formatting instructions, and other behavioral attributes of a web page, including links to other web pages or resource files containing image, video, and audio data.

Figure 5:
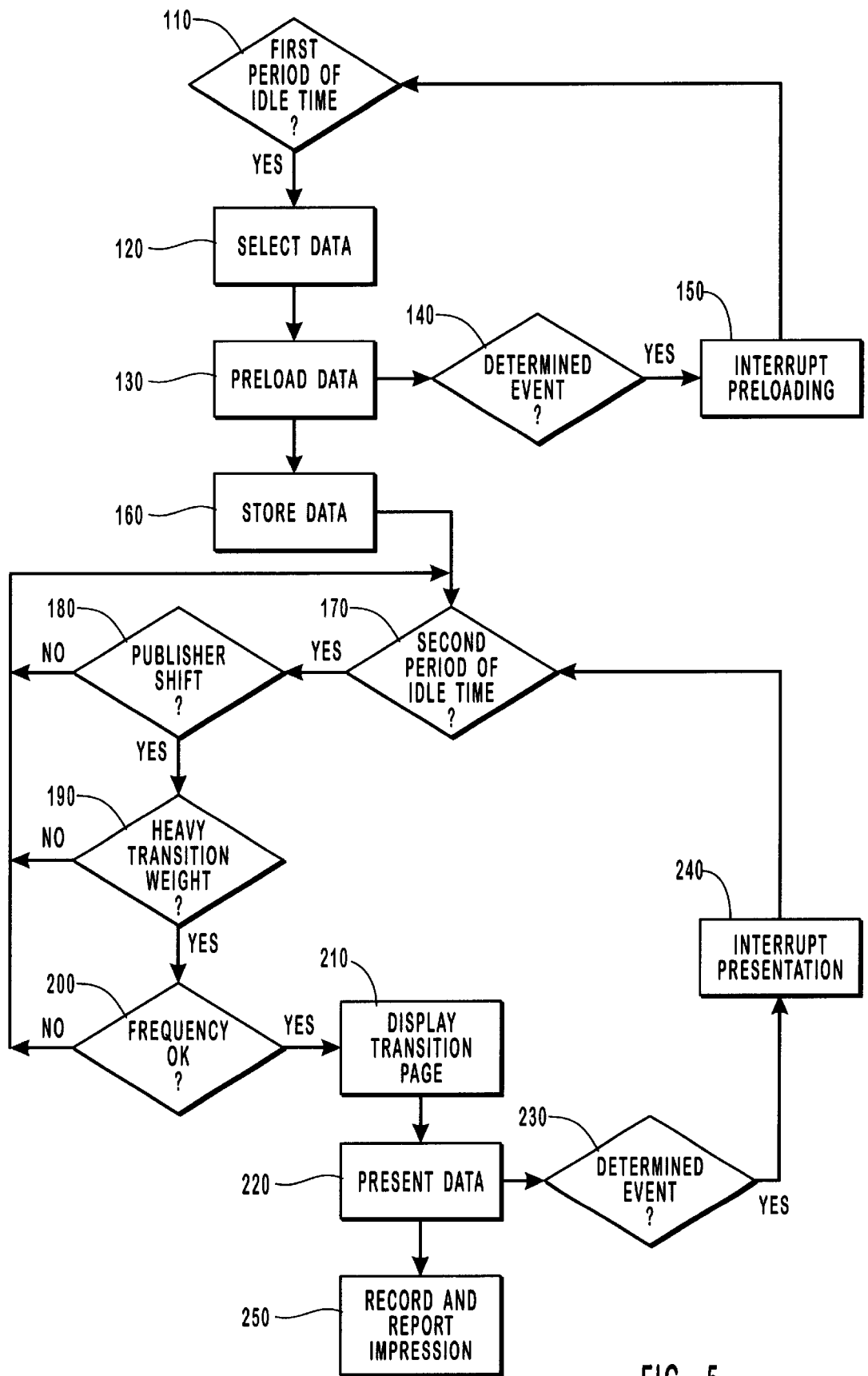
FIG. 5 is a flowchart illustrating a method for distributing data through a communications network.

In the above-described environments, a method for preloading and presenting certain data, such as advertising data, during periods when browsing device 10 would otherwise experience idle time, may be practiced as follows. As shown in FIG. 5 at 110, the browsing device detects a first period of idle time in browsing device operation. This first period of idle time may be an extended period of nonuse of the browsing device, such as when the main functional components of the browsing device are turned off during late night or early morning hours. Typically, such an extended period of nonuse is identified by the user, the user specifying a time of day when the browsing device is not likely to be m use. Alternatively, a sensor, implemented in hardware and/or software, may be employed to record the length of time the main functional components of the browsing device have been turned off, and wake the browsing device after a predetermined period of time. In another alternative, this first period of idle time may be a period of temporary inactivity in browsing device operation, such as a period of network communications inactivity, a connect waiting period during which the browsing device is attempting to connect to a remote server through the communications network, or a stalled download period during which the browsing device is connected to, but not receiving information from, a remote server. A period of network communications inactivity occurs when the browsing device, or alternatively the browser program, is not engaged in any communication over the communications network. The browser may establish contact with the host server through the communications network upon detecting the first period of idle time. Alternately, the browsing device and host server may maintain constant contact.

As shown at 120, either after or prior to establishing contact, a selection program module at the host server selects data, typically advertising data, to download to the browsing device from the host server. While the selection program typically resides at the host server, those skilled in the art will appreciate that it could alternately reside on any device connected to communications network 96, and communicate selected data to the host server over the communications network.

The selection program examines outstanding orders from advertisers, and selects data containing an advertisement, a group of advertisements, or other data, to preload into the memory of the browsing device over the communications network upon detection of the first period of idle time. Internet advertising typically is sold by a unit of presentation time known as an impression. Advertisers may purchase a number of impressions for a particular advertisement to be presented within a given time period. For example, an advertiser may purchase 6000 impressions of an advertisement to be presented to users in July. The selection program balances outstanding orders for impressions of advertisements and chooses the most appropriate advertisement for presentation. For alternative methods of selection of data, see the copending U.S. Patent application entitled "System for Targeting Information to Specific Users on a Computer Network" filed Sep. 8, 1998, by inventors John Adelus, Dean Blackketter, Alan Cohn, and Thomas Scoff, the disclosure of which is herein incorporated by reference.

As indicated at 130, the data is preloaded from the host server to the memory of the browsing device over the communications network. At step 140, the browsing device attempts to detect a determined browsing device event during preloading. The determined browsing device event, for example, may be an initiation of other network communications activity by the browser program and/or browsing device, such as downloading a new web page. Alternatively, the determined browsing device event may be a user interaction with the graphical user interface of the browser program.

If a determined browsing device event is detected, the browsing device will interrupt the preloading of information to resume or restart at a later time, as shown at step 150.

After establishing contact and preloading, the data is then stored, at step 160, in the browsing device. The data may be stored in memory such as RAM, a mass storage device such as a hard drive, or other memory device.

To avoid unnecessary downloading of data, browsing device 10 may communicate to the selection program the identity of data which the browsing device has currently cached in memory and/or on a mass storage device. The selection program typically does not instruct the host server to download data already stored in the browsing 10 device. The selection program thus has the capability to remember which data has been preloaded to a given browsing device, and refrain from unnecessarily downloading the same data twice.

As shown at 170, at some point after the data is preloaded and stored, either during the same session of use or at some later time, the browsing device detects a second period of idle time in browsing device operation. This second period of idle time may occur at various points of inactivity in the graphical user interface of the browsing device. The second period of idle time, for example, may be a download waiting period during which the browsing device has attempted to begin, but has not completed, downloading information from a remote server on the communications network. Alternately, the second period of idle time may be a connect waiting period during which the browsing device attempts to, but is temporarily unable to, connect with a remote computer on the network. Furthermore, the second period of idle time may be a start-up waiting period during a start-up operation of the browsing device, after which certain components of the browsing device are functional such that the data may be displayed. Data is only presented during time in which the browsing device would otherwise be idle. Therefore, user operation of the browsing device is not delayed or encumbered.

To control the flow of advertising, the browsing device can independently evaluate three conditions before proceeding to present the data to the user through the browser. First, as shown at 180, when the user inputs a destination URL into the GUI of the browsing device, the browsing device detects whether a publisher shift has occurred.

Alternatively stated, the browsing device detects whether the destination URL is an address to a web page published by a different publisher than the publisher of the currently viewed URL. Publisher shifts may be detected by applying a predetermined process to compare the domain names of a current URL and a destination URL for commonalities typically associated with a common publisher, such as identical top and mid level domains within each domain name. For an example of such a process, see the copending U.S. Patent Application entitled "System And Method For Controlling Delivery Of Content Over A Communications Network" filed Sep. 8, 1998 by Timo Bruck and Alan Cohn, the disclosure of which is herein incorporated by reference. Advertising data typically will be presented only if a publisher shift has occurred.

Second, if a publisher shift has occurred, the browsing device determines the "weight" of the transition between URLs, as shown at step 190. A transition designated as "heavy" is eligible for a display of data. A transition designated as "light" is ineligible. Preferably, all publisher shift transitions are predetermined to be heavy, such that data may be displayed at each publisher shift. All other transitions are light.

Third, as shown at step 200, the frequency of data presentation according to the present invention may be throttled by communicating a frequency value from the host server to the browsing device, and determining whether a minimum period of time corresponding to the frequency value has elapsed since a previous presentation of data. If the minimum period of time has not yet elapsed, the data will not be presented. Once the minimum period of time has elapsed, the browsing device will allow the presentation of data, and thereafter, will start the time period anew to measure the next interval between data presentations.

Once the browsing device determines that data will be presented, the browsing device displays a transition page at step 210, which provides the format for the display of the data. The transition page typically is encoded in HTML format and saved in a mass storage device of the browsing device. Upon command from the host server the browsing device can download a new transition page with a new format from the host server, or from some other remote server connected to the communications network. A new transition page may be downloaded multiple times during a single use session of the browsing device by a user, such that the format for display of the data changes during the session. Alternately, the transition page is hard-coded into the browser software in the browsing device. The transition page may appear to be opaque, such that no other web page can be seen through the transition page. Alternately, the transition page may appear partially translucent, such that either the currently viewed page or the destination page is visible through part of the transition page. The transition page may be formatted to contain data that is text data, graphical data, audio data, or video data.

After displaying the transition page, the browsing device commences to display the preloaded data according to the format prescribed by the transition page, as shown at step 220. The data may be of virtually any type interpretable by the browsing device, including but not limited to moving images encoded in MACROMEDIA flash, mpeg video, avi, or animated gif formats, pictures encoded in gif, jpeg, or pict formats, or audio encoded in wav, aiff, or snd formats.

Once the data is displayed, the browsing device, at step 230, attempts to detect a determined browsing device event, such as user interaction with the graphical user interface of the browsing device or completion of a download of a web page. Where the second period of idle time is a connect waiting period, the determined browsing device event may be a successful connection to a remote server.

When the browsing device detects the determined browsing device event, the browsing device interrupts the display of the transition page and data, as shown at step 240. Thereafter, the browsing device displays the web page the browsing device was preparing to display, or waiting to connect to, at the commencement of the second period of idle time. Where the data contains more than one advertisement, presentation of a first advertisement may be immediately followed by the presentation of a second advertisement. Alternatively, the browsing device may wait until detection of a third period of idle time to present the second advertisement. The browsing device also may resume presentation of data that is interrupted by the determined browsing device event upon detection of a third period of idle time by the browsing device.

Preferably, the browsing device records the length of presentation time of the data, as shown at step 250. Once the data has been presented for a predetermined amount of time, the browsing device may report to the host server that a completed impression of the data has been achieved. Alternatively, the browsing device may report the actual length of the presentation time of the data to the host server. The host server may reprogram the browsing device through the communications network to adjust the predetermined amount of time required for an impression.

Typically, the browsing device records an impression even where the presentation of the data is interrupted. This is accomplished by adding a period of pre-interruption presentation time to a period of post-interruption presentation time to satisfy the predetermined amount of time required for an impression. The host server also can instruct the browsing device to report completion of an impression to the host server only if the data is displayed for the predetermined amount of time without interruption. The browsing device typically records the length of time the data is presented in discrete time intervals. The browsing device may record the length of time the data is presented in real time.

For large advertisements such as lengthy video presentations, which require great amounts of time to download, the present invention typically is practiced by preloading data upon detection of an extended period of nonuse of the browsing device (e.g., when the browsing device would otherwise be turned off), and displaying the video data during the start-up operation of the browsing device. Such an extended period of nonuse, as occurs in the early morning hours when users are asleep, typically is identified by the user; the user specifying a time of day when the browsing device is not in use. Alternatively, the extended period of nonuse may be detected by a sensor in the browsing device.

Figure 6:
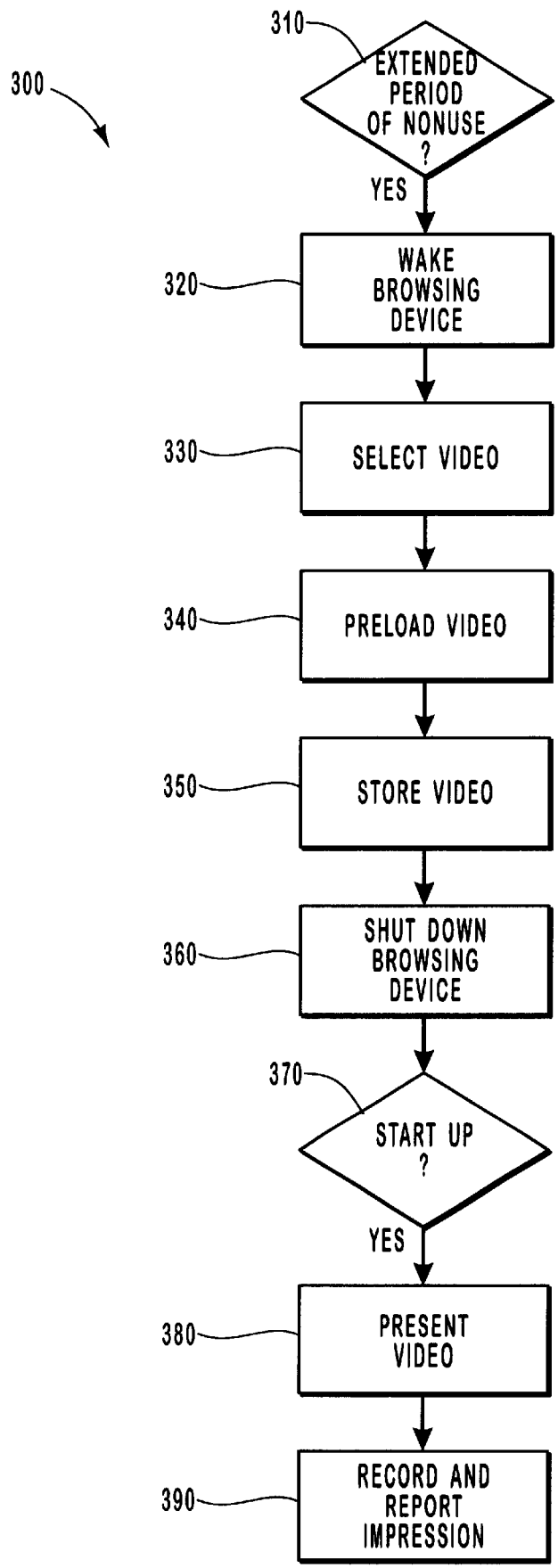
FIG. 6 is a flowchart illustrating a method for distributing data through a communications network to be presented on start-up of a browsing device.

As shown at step 310 in FIG. 6, the extended period of nonuse is detected by the browsing device, typically at a user identified time, and the browsing device wakes from nonuse and contacts the host server, as indicated at 320. At step 330, the host server selects a video advertisement according to a predetermined advertising management process. The host server preloads the selected video advertisement to the browsing device during the period of nonuse, as shown at 340, and the browsing device stores the video advertisement 350 on a mass storage device such as a hard drive. The browsing device typically shuts down after successfully preloading the video advertisement and returns to a state of nonuse, as shown at step 360.

At step 370, the browsing device detects the start-up operation. At step 380, while waiting for the browsing device to complete the start-up operation and make a connection with the host server, a period also referred to as the start-up waiting period, the browsing device presents the video advertisement on the display device. Typically, a video advertisement is 15 or 30 seconds in length, depending on the amount of memory available on the browsing device. A video advertisement is typically shown in its entirety before the start-up operation is complete. However, presentation of a video advertisement may be interrupted by the browsing device upon detection of the completion of the start-up operation and start-up waiting period. As shown at 390, when the video advertisement is shown to completion the browsing device records the successful presentation of the video advertisement, and reports completion of the presentation (also referred to as an impression) to the host server through the communications network.

Figure 7:
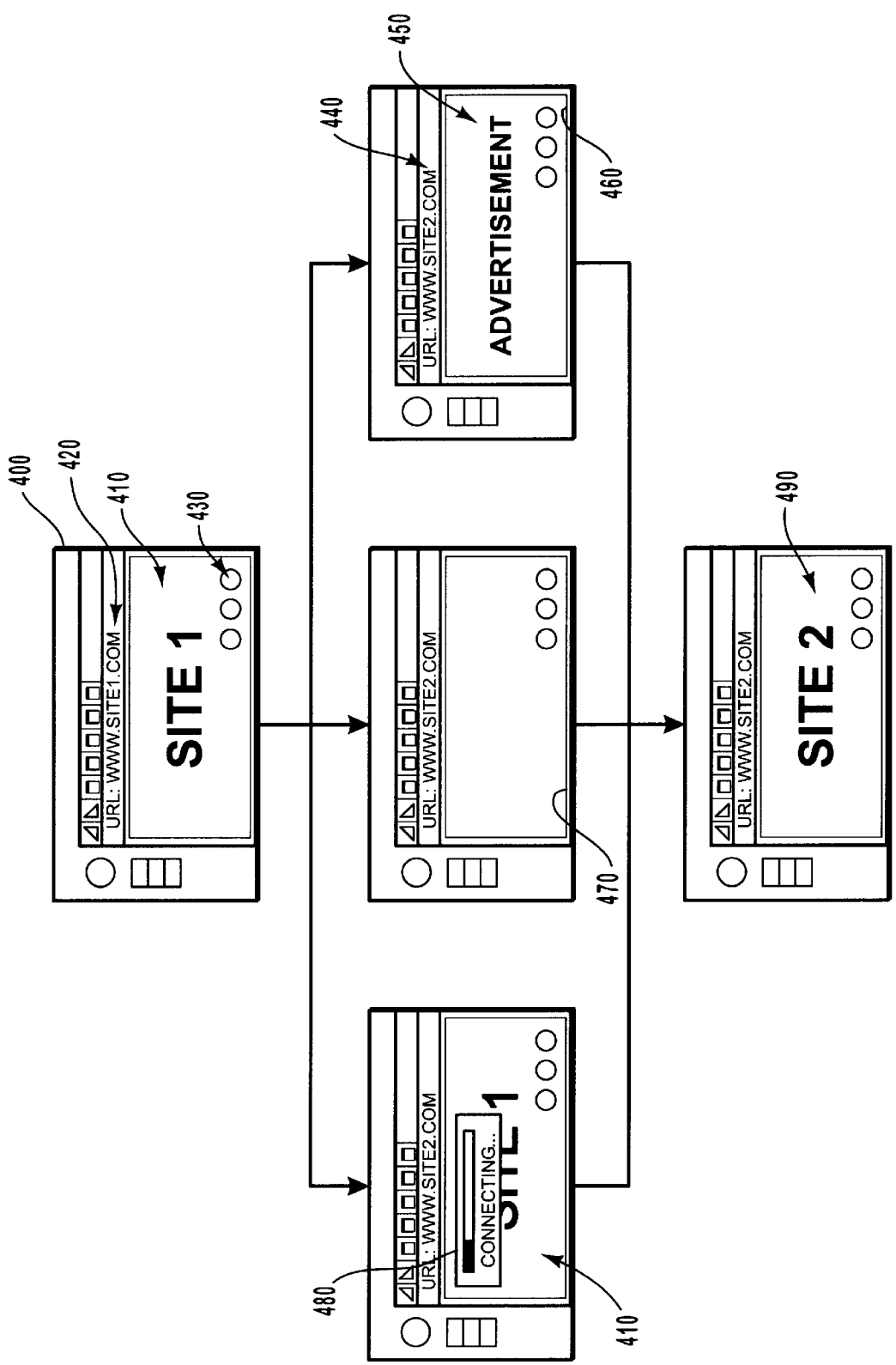
FIG. 7 is a schematic view of the transitions available to a user when switching between web pages.

For smaller quantities of data, such as graphical banners or MACROMEDIA flash presentations, data may be preloaded during periods of temporary inactivity in the network communications of the browsing device and/or browser program, and presented during download waiting periods. As shown in FIG. 7, the graphical user interface 400 displays a current web page 410 located at a current URL 420. The browsing device receives a user command to download a destination web page, for example, when a user selects a hypertext link 430 or inputs a destination URL 440. Upon receiving such a command, the browsing device preferably displays an advertisement 450 within a transition page 460 while the browsing device is transitioning from displaying the current web page to displaying the destination web page. Where display of an advertisement is not desirable, the browsing device also may trigger the display of a progress bar 480 over the current web page 410, or blank transition page 470 during the download waiting period. After completion of the download waiting period, the browsing device displays a destination web page 490, located at the destination URL 440.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower, or equal in scope to the original claims.

What is claimed and desired to be secured by United States Letters Patent is:

1. In a computer network including a plurality of servers logically connected to one another and to a plurality of client systems a method of delivering data from a host server to a client system, the method comprising:
   detecting a first period of idle time of the client system during which the client system has not been used to browse the network;
   establishing contact between the client system and the host server during the first period of idle time;
   preloading data selected by the host server to the client system in response to information communicated by the client system which identifies data already cached at the client system;
   detecting a second period of idle time at the client system; and
   presenting the data at the client system upon detecting the second period of idle time.

2. The method of claim 1 further comprising reporting to the host server that the data has been presented at the client system.

3. The method of claim 1, further comprising:
   detecting a determined client system event during preloading; and
   interrupting preloading upon detecting the determined client system event.

4. The method of claim 3, wherein the determined client system event is a user interaction with a graphical user interface of the client systems.

5. The method of claim 3, wherein the determined client system event is an initiation of other network communications by the client system.

6. The method of claim 1, further comprising:
   detecting a determined client system event during presenting of the data; and
   interrupting the presenting of the data upon detecting the determined client system event.

7. The method of claim 6, wherein the determined client system event is a user interaction with a graphical user interface of the client system.

8. The method of claim 6, wherein the determined client system event is completion of a download of a web page.

9. The method of claim 6, further including resuming presentation of the data upon detecting a third period of idle time in client system operation.

10. The method of claim 1, wherein the first period of idle time is a period of temporary inactivity of the client system, and wherein preloading the data occurs during the period of temporary inactivity.

11. The method of claim 10, wherein the period of temporary inactivity is a period of graphical user interface inactivity.

12. The method of claim 10, wherein the period of temporary inactivity is a period of network communications inactivity of the client system.

13. The method of claim 10, wherein the period of temporary inactivity is a stalled download period during which the client system is connected to, but not receiving information from, a remote server.

14. The method of claim 1, wherein the second period of idle time is a connect waiting period during which the client system attempts to connect to a remote server on the network.

15. The method of claim 1, wherein the second period of idle time is a download waiting period during which the client system has attempted to begin, but has not completed, downloading information from a remote server on the network.

16. The method of claim 1, wherein the data is text data.

17. The method of claim 1, wherein the data is graphical data.

18. The method of claim 1, wherein the data is audio data.

19. The method of claim 1, wherein the data is video data.

20. The method of claim 1, wherein the data is advertising data.

21. The method of claim 1, further comprising:
displaying a transition page on the client system, the transition page including a format for the data, and
presenting the data according to the format of the transition page.

22. The method of claim 21, further comprising:
downloading the format for the transition page from the host server to the client system through the network.

23. The method of claim 22, wherein the downloading is achieved by transmitting a URL from the host server to the client system and downloading HTML code containing the format for the transition page from an Internet site located at the URL to the browsing device.

24. The method of claim 23, wherein downloading HTML code containing the format occurs multiple times during a single use session of the client system, such that the format for the data changes during the session.

25. The method of claim 21, wherein the transition page is opaque.

26. The method of claim 21, wherein the transition page is partially translucent, such that a separate page is visible through part of the transition page.

27. The method of claim 1, further comprising:
before presenting the data, determining, whether a minimum period of time has elapsed since a previous presentation of data, and preventing presentation of the data if the minimum period of time has not elapsed.

28. The method of claim 27, wherein the minimum period of time is communicated from the host server to the client system through the network.

29. The method as recited in claim 1 further comprising:
establishing an impression interval; and
reporting to the host server that the data has been presented only if presenting the data occurred for at least the impression interval.

30. The method as recited in claim 29, wherein the impression interval is communicated from the host server to the client system through the network.

31. The method as recited in claim 29, wherein an impression is reported to the host server when the data is presented during at least two separate time intervals for a total time of at least the impression interval.

32. In a computer network including a plurality of servers logically connected to one another and to a plurality of client systems, a computer program product for implementing a method of delivering data from a host server to a client system, comprising:
a computer readable medium for carrying machine executable instructions for implementing said method; and
wherein said method is comprises:
detecting a first period of idle time of the client system during which the client system has not been used to browse the network;
establishing contact between the client system and the host server during the first period of idle time;
preloading data selected by the host server to the client system in response to information communicated by the client system which identifies data already cached at the client system;
detecting a second period of idle time at the client system;
presenting the data at the client system upon detecting the second period of idle time.

33. A computer program product as recited in claim 32, wherein the method implemented by machine executable instructions further comprises reporting to the host server that the data has been presented at the client system.

34. A computer program product as recited in claim 32, wherein the method implemented by machine executable instructions further comprises:
detecting a determined client system event during preloading; and
interrupting preloading upon detecting the determined client system event.

35. A computer program product as recited in claim 32, wherein the method implemented by machine executable instructions further comprises:
detecting a determined client system event during presenting of the data; and
interrupting the presenting of the data upon detecting the determined client system event.

36. A computer program product as recited in claim 35, wherein the method implemented by machine executable instructions further comprises resuming presentation of the data upon detecting a third period of idle time in client system operation.

37. A computer program product as recited in claim 32, wherein the first period of idle time is a period of temporary inactivity of the client system, and wherein preloading the data occurs during the period of temporary inactivity.

38. A computer program product as recited in claim 32, wherein the method implemented by machine executable instructions further comprises:
displaying a transition page on the client system, the transition page including a format for the data, and
presenting the data according to the format of the transition page.

39. A computer program product as recited in claim 32, wherein the method implemented by machine executable instructions further comprises:
before presenting the data, determining whether a minimum period of time has elapsed since a previous presentation of data, and preventing presentation of the data if the minimum period of time has not elapsed.

40. A computer program product as recited in claim 32, wherein the method implemented by machine executable instructions further comprises:
establishing an impression interval; and
reporting to the host server that the data has been presented only if presenting the data occurred for at least the impression interval.

41. In a computer network including a plurality of servers logically connected to one another and to a plurality of client systems, a method of delivering data from a host server to a client system, the method comprising:
detecting a first period of idle time of the client system during which the client system has not been used to browse the network;
establishing contact between the client system and the host server during the first period of idle time;

preloading data selected by the host server to the client system in response to information communicated by the client system which identifies data already cached at the client system;

detecting a second period of idle time at the client system; and presenting the data at the client system upon detecting the second period of idle time; and reporting to the host server that the data has been presented at the client system.

* * * * *